United States Patent

[11] 3,628,557

[72] Inventor Harry Newborough
    Fife, Scotland
[21] Appl. No. 12,299
[22] Filed Feb. 18, 1970
[45] Patented Dec. 21, 1971
[73] Assignee The Cessna Aircraft Company
    Wichita, Kans.
[32] Priority Aug. 15, 1969
[33] Great Britain
[31] 40,823/69

[54] VARIABLE PREFERENTIAL FLOW CONTROL VALVE
6 Claims, 4 Drawing Figs.

[52] U.S. Cl. .................................................. 137/116.3,
    137/117, 137/495, 137/501
[51] Int. Cl. ........................................................ F16k 31/12
[50] Field of Search ........................................... 137/101,
    116.3, 117, 495

[56] References Cited
UNITED STATES PATENTS
2,445,544 7/1948 Trautman .................... 137/117
2,573,563 10/1951 Gardiner ..................... 137/495 X
2,752,931 7/1956 Schutmaat ................... 137/495 X
3,098,507 7/1963 Froslie ........................ 137/495 X
3,217,731 11/1965 Swanson ..................... 137/116.3

Primary Examiner—Robert G. Nilson
Attorneys—Gregory J. Nelson, James W. McFarland and Miller & Brown ABSTRACT: A priority flow control valve for directing a constant flow from the valve inlet to a primary circuit with any excess being directed to a secondary circuit. A cannelured control spool in the valve positions itself responsive to the pressure drop across a variable flow control orifice to proportion inlet flow between the primary and secondary circuits. A control handle for adjusting the variable orifice is provided with a cam which actuates a follower adapted to position the spool in a dumping position when the orifice restriction is reduced to a predetermined size. One additional feature includes a relief valve in communication with a pilot flow in the discharge passage which operates to relieve pressure to permit the pressure acting against the valve spool to move the main valve to a dumping position when a predetermined system pressure is exceeded.

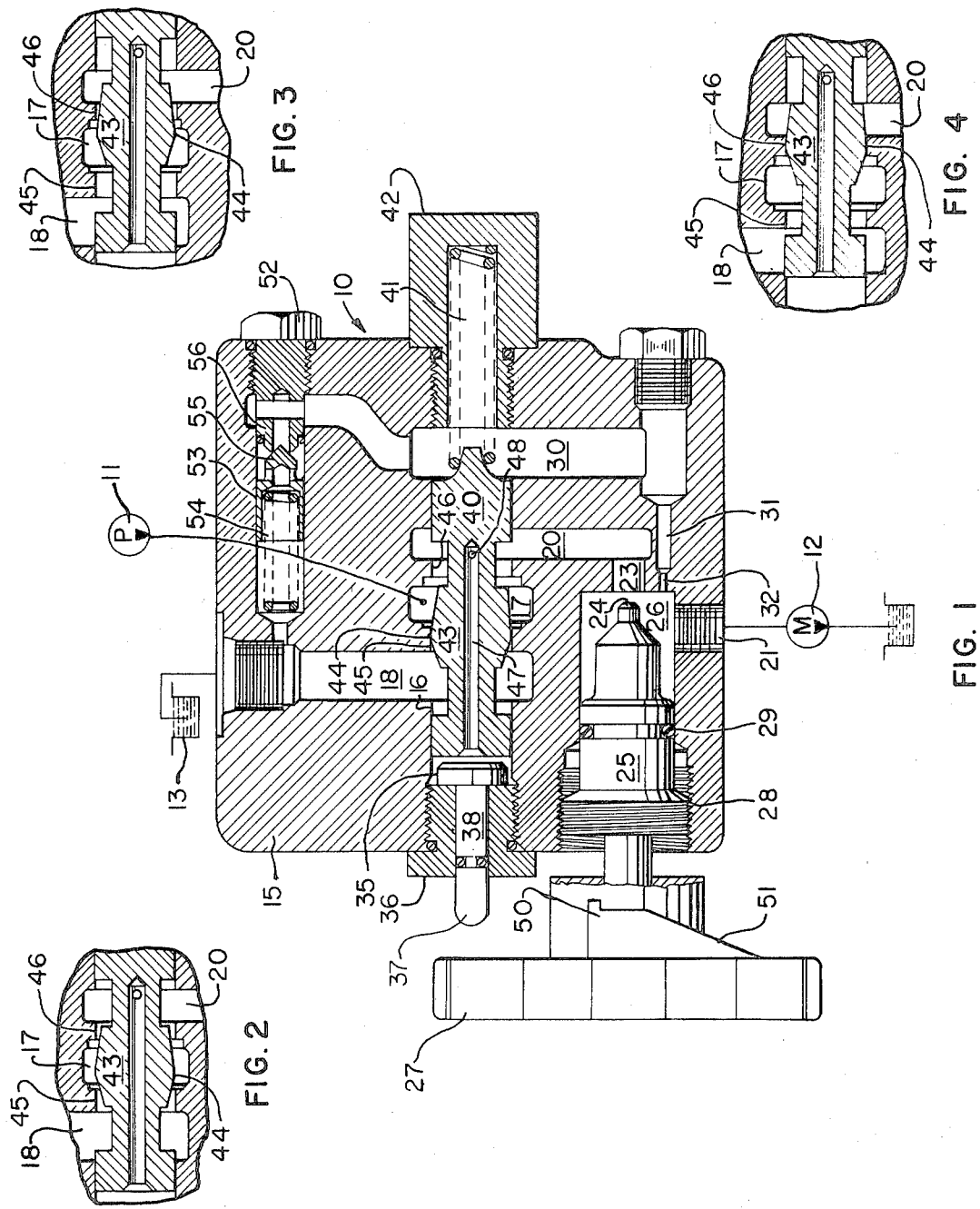

VARIABLE PREFERENTIAL FLOW CONTROL VALVE

This invention relates to fluid flow control valves and particularly to the type that are pressure-responsive-actuated preferential flow dividers.

Preferential flow divider valves are placed in a hydraulic system having a source of fluid pressure and a driven motor to ensure a constant volume delivery of fluid to the motor regardless of varying load conditions. Constant volumetric delivery of pressure fluid to the motor maintains a constant motor speed. Typical examples of applications utilizing a flow divider are conveyor systems and combine reel drives. It should be noted that the terms "constant delivery" and "constant flow" as used herein, are not absolute and are generally understood in the field of hydraulics to include some permissible variation in flow rate, depending on the system.

The prior art suggests a number of proposals for providing constant flow to a driven machine. Typical of these are as shown in U.S. Pat. No. 2,665,704 issued to Kanuch, which shows a flow control valve having an inlet passage, outlet passage, and a bypass outlet. A manually adjustable flow control orifice is interposed between the valve inlet and outlet passages and a pressure responsive valve spool controls communication between the inlet passage and the bypass outlet. Variations in outlet pressure, as a function of flow across the orifice, act upon the valve spool to control the volume of total inlet fluid delivered to bypass, therefore maintaining a constant volume of pressure liquid delivered to the point of use. The speed of the regulated motor is determined by the degree of opening of the flow control orifice.

Many flow controls of this type require a substantially constant fluid pressure source and are not always effective to control flow when substantial inlet pressure and flow variations occur. Further, if it is desired to manually dump or divert the entire flow of fluid to the bypass port, it is necessary to manually close the orifice valve between inlet and outlet passages and allow pressure in the inlet passage to build to sufficient pressure to actuate the bypass valve to an open position, resulting in an inefficient waste of pump power.

In view of the foregoing, it is a primary object to provide a control valve that automatically operates to maintain a constant pressure differential across a flow control orifice to maintain a predetermined divisions of inlet flow rate through a priority and secondary flow circuit, including means for selectively diverting entire inlet flow through the secondary circuit.

Another object is to provide a preferential flow control valve which is variable to allow adjustment of the desired flow to the priority circuit.

Another object is to provide a flow control valve incorporating a pilot relief valve that operates to place the main valve in a dumping position when a predetermined system pressure is exceeded.

A specific object is to provide a variable preferential flow divider valve with facility for diverting inlet flow by providing means for overriding the automatic positioning of the flow control spool and repositioning the spool to direct all flow to the secondary outlet.

Other objects and advantages will become apparent from the following description, claims, and accompanying drawings, wherein:

FIG. 1 shows an axial view, primarily in section, of the flow divider valve of the present invention connected in a hydraulic system, the valve being shown in a position whereby the entire inlet flow is being delivered to the motor through the priority circuit;

FIG. 2 is a fragmentary view of a part of the valve showing the control spool right of the position in FIG. 1 to partially divert input flow to the secondary circuit;

FIG. 3 is a fragmentary view of a part of the valve showing the control spool in a rightward blocking position permitting a small flow to the primary circuit; and, FIG. 4 is also a fragmentary view showing the control spool in a rightward override position desirable for some systems wherein all flow to the primary circuit is blocked.

In carrying out my invention, I provide a variably positionable pressure-responsive valve spool having a control surface adapted to proportion fluid flow between priority and secondary outlet passages. The position of the valve spool is automatically controlled by the pressure drop across a variable orifice as being indicative of rate of flow. Override means are provided which permit the positioning of the spool in a dumping position where total flow may be diverted to the secondary circuit. A high pressure pilot relief valve communicates with the priority circuit and opens under excessive pressure to cause the valve spool to move to a position wherein input flow is diverted to the secondary circuit to relief pressure.

Referring to FIG. 1 of the drawings, the priority control valve, generally indicated as 10, is shown connected in a hydraulic system including hydraulic pump 11, primary motor 12, and a secondary system shown as reservoir 13. The pump 12 may be, for example, a gear pump which is essentially a constant delivery and variable pressure machine. The motor 12 may also be of the gear type arranged to drive a variable load as, for example a reel drive on a combine. Such an application requires a constant speed, hence a constant flow rate to the motor, regardless of the varying loads placed on the reel due to changes in combine speed and crop density. The secondary delivery circuit 13 is shown as a reservoir but could, of course, be another motor or device for performing useful work.

More particularly, valve 10 has a body 15 having a generally longitudinal bore 16 which is intersected by inlet passage 17. Pressure fluid is supplied to the inlet by pump 11. Located adjacent inlet passage 17 and intersecting bore 16 are secondary discharge passage 18 and priority outlet passage 20. Outlet port 21 is connected to motor 12 and is in communication with passage 20 through control orifice 23 to complete the priority circuit to the motor. The pressure drop created across orifice 23 is indicative of flow through the priority circuit to motor 12.

The size of the opening through orifice 23 is defined by the cooperating end 24 of piston 25 which is adjustable within bore 26. Annular O-ring type seal 29 prevents high pressure fluid leakage from the valve through bore 26 around piston 25. Adjustment of piston 25 is accomplished by turning handle 27 to rotate the piston thereby advancing piston 25 in either direction along cooperating threads 28. For example, turning handle 27 clockwise will advance piston 25 to reduce the orifice opening through 23 around 24 to increase the pressure drop due to a specific flow rate through the orifice. Counterclockwise revolution of handle opens the size of the opening at orifice 23 to lessen the pressure drop thereacross due to a specific flow rate.

Bore 16 is closed on the left end by threaded plug 36, which is axially bored to receive stem 37 of plunger 38 which is reciprocable through plug 36. When plunger 38 is retracted as shown in FIG. 1, the left end of stem 37 extends outward of valve body 15 and is engageable by a cam 50 on the inner side of handle 27, as will be described in more detail hereafter.

The control spool 40 is movable within bore 16 and is biased to the left by a pressure drop balancing compression spring 41 acting between cap 42 and the right end of spool 40. The control surface 43 of spool 40 has a major diametral portion 44 which blocks flow between inlet 17 and secondary circuit passage 18 when the spool is in position as shown in FIG. 1, with section 44 within the axial length of land 45. In rightward position as shown in FIG. 4, major diameter 44 will cooperate with land 46 to block flow through the primary or priority circuit to outlet 21. In the position of FIG. 3, control surface 43 is of a configuration to permit a minimum metered flow to the priority circuit. It will be seen that intermediate these two extreme positions, as shown in FIG. 2, the bevel surface of spool 43 will proportion the flow between the secondary and priority circuit, depending on the axial position of spool 40. The particular angularity of the inward longitudinal bevels away from land 44 is not highly critical and is basically a matter of choice. I have shown about a 15° bevel which works well to maintain a substantially constant flow to the priority circuit.

In operation, spool 40 is pressure balanced and functions to divide flow between the secondary and primary circuits to maintain a constant predetermined rate of flow to the priority circuit.

Orifice 23 in the priority circuit senses the rate of flow in the priority circuit as the pressure drop across the orifice is indicative of the rate of flow. The pressure drop is also imposed against both ends of the valve spool 40. The higher pressure above the orifice is transmitted to the left end of the spool at chamber 35 through spool axial bore 47 and cross bore 48, which are always in communication with the pressure existing in passage 20. The lower pressure at the downstream side of orifice 23 is transmitted to the right end of spool 40 through fixed orifice 32 and passages 31 and 30. As the flow rate increases, the pressure drop across the orifice at 23 increases, causing the pressure exerted against the left end of the spool to urge the spool rightwardly, directing a greater portion of incoming flow to the secondary circuit. If the pressure differential across the orifice and spool 40 is equivalent to the force exerted by the spring, the valve is balanced and the correct flow is passing to the motor 12. If the flow rate becomes too low, the orifice pressure drop will allow the spring to move the spool to the left to increase flow to passage 20 to the desired rate.

To permit adjustment of the desired flow rate to the priority circuit, orifice 23 is manually variable by turning control handle 27 to position piston 25 on threads 28. For example, by turning handle 27 counterclockwise, orifice 23 can be made larger by retracting piston 25, which requires a greater rate of flow through the orifice to produce the pressure drop required to balance spring 41. Valve 40 will then balance at a position where the predetermined flow is directed to passage 20 and to outlet.

It should be noted that the position of piston 25 which controls the orifice size at 23 can be adjusted by other than a manual handle. For example, piston 25 could be axially positioned in its bore automatically in response to some remote signal such as by a DC moor controlled by an electrical signal.

Described so far has been the normal operation of may priority flow control valve. However, I also contemplate the inclusion of a pilot relief circuit and a manual override which causes diversion of total inlet flow to the secondary circuit. With prior art flow control valves, closing off flow to the priority circuit has been accomplished by simply blocking off the restriction at 23. The disadvantage in this method is that incoming flow will build to an excessively high, power wasting pressure in order to dump flow across the bypass or relief valve. Another disadvantage of dumping flow by closing of the priority circuit is that once the orifice at 23 is blocked off, the priority circuit including passages 21, 31, and 30, form a second hydraulic circuit completely independent from rest of the system. The pressure in this second circuit is dependent only on the mass of any load that it may be supporting at 12, so that a heavy load maintains a large back pressure in chamber 30 which urges spool 40 to the left. To move spool 40 rightward to a diverting position, the inlet pressure must build to a higher pressure than exits in passage 30, with consequent waste of power.

To avoid the foregoing disadvantages, I contemplate a shutoff or dump without completely closing restriction 23 by providing means for repositioning the valve spool in a diverting position. By turning handle 27, pin 37 is depressed, moving plunger 38 into contact with spool 40 to move the spool into a diverting position, as in FIG. 4, blocking flow to passage 20.

Because orifice 23 remains open, chambers 41 and 35 are in communication and are equalized. Manual actuation of spool 40 need only overcome the bias exerted by spring 41 with no excessive pressure built by pump 11.

Control handle 27 is provided with a cam 50 on its inner side having cam surface 51. The outer end of pin 37 serves as a follower and it will easily be seen that when handle 27 is rotated fully clockwise, pin 37 will be driven inward by surface 51, causing plunger 38 to move spool 40 to a rightward override position. At the same time, full clockwise rotation of handle 27 will also cause piston 25 to move inward until end 24 assumes a cooperating position with orifice 23 restricting the orifice opening leaving only a minimum opening therethrough.

In the override position, incoming flow is diverted to the secondary circuit with the position of spool 43 being as shown in either FIG. 3 or 4. I have found it desirable to adjust the relationship of cam surface 51 to follow plunger 36 to urge the spool to the right-hand position shown in FIG. 3, permitting some leakage flow to the priority circuit in systems where the load at 12 is heavy. This allows a minimum equalization flow through the primary circuit and will permit the relief valve to actuate under excessive pressure. In systems where the load at 12 is light, the complete shutoff position of FIG. 4 is generally preferred. The override position of spool 40 is determined by the relationship of cam surface 51 to plunger 37 which controls the extent to which spool surface 43 moves to the right.

It will also be noted that with my unique arrangement for overriding the control spool position to divert inlet flow to the secondary port, the positioning of the variable orifice and the control spool is coordinated through handle 27. However, it would be possible, if desired, to use a separate mechanical lever to position the dump valve independent of the orifice-positioning piston.

A pilot relief valve 52 is positioned in body 10 in bore 53 which intersects at one end an extension of pressure passage 30 and, thus, communicates with the priority circuit. The opposite end of bore 53 communicates with the secondary circuit at passage 18, or with some other point for receiving pilot flow when the valve opens. Reciprocable within bore 53 is spring biased poppet 54 which has a conical end 55 which engages seat 56 in a closed position. Whenever pressure in passage 30 becomes excessive due to the load at 12, pilot valve opens and conical face 55 moves away from seat 56, causing fluid to be relieved to passage 18 or other point. This permits the higher pressure existing in chamber 35 to urge valve 40 to the right to divert flow to the secondary circuit and relieve the excess pressure in the system.

The higher pressure is maintained in chambers 20 and 35 through the orifice arrangement with orifices at 23 and 32 being in series with the smaller fixed orifice 32 controlling the flow to the pilot valve. When the pilot relief valve 52 opens, spool 40 controls automatically and will compensate for any changes in pressure.

Valve 52 is small, as it need carry only a small volume of fluid because it acts as a pilot to cause the main valve 40 to dump the fluid flow to relieve pressure. Once excessive pressure is eliminated, poppet 54 is spring-returned to its closed position and normal valve operation is resumed. The setting of relief valve 52 is dependent upon the system and its requirements. It will be obvious to substitute a variable type of relief valve 52 which can be adjusted to various pressure settings.

In summary, I have provided a valve which carries out the normal functions of a flow divider priority valve and, in addition, is manually actuable to dump incoming flow and automatically actuable to prevent overpressurization of the hydraulic system.

Various other changes and modifications will be obvious to those skilled in the art. To the extent that these changes do not depart from the spirit and scope of the appended claims they are covered thereby.

Having described my invention with sufficient clarity so that those skilled in the art may construct and use it, I claim:

1. A control valve comprising a body having a bore therein with an inlet passage intersecting said bore for delivery of fluid to said valve, primary and secondary outlet passages intersecting said bore for exhausting pressure fluid from said valve, an adjustable throttling orifice in the flow path from said inlet passage through said primary outlet, valve means positionable in said bore to proportion flow between said primary and secondary outlet passages, said valve means being pressure actuated responsive to the pressure drop across said orifice to maintain a position whereby pressure fluid is diverted to said secondary outlet to maintain a substantially constant predetermined flow through said primary outlet passage, means for selectively overriding the pressure actuation of said valve means to reposition said valve means in a flow-diverting position connecting said inlet and secondary outlet in hydraulic communication whereby substantially all inlet flow will be diverted to said secondary circuit, said means for selectively overriding the pressure actuation of said valve means including operator means adapted to selectively adjust said throttling orifice to a predetermined opening and selectively actuate said override means to urge said valve means to said flow-diverting position.

2. The control vale of claim 1 wherein said valve means is a cannelured valve spool and said means for selectively overriding the pressure actuation of said valve spool comprises means for mechanically biasing said valve spool to a position wherein said inlet and secondary outlet passages are in hydraulic communication at said cannelured spool and flow is blocked to said primary outlet.

3. A control valve comprising a body having a bore therein with an inlet passage intersecting said bore at a first location for delivery of fluid to said valve, secondary and primary outlet passages intersecting said bore at second and third locations respectively adjacent either side of said inlet passage, a cannelured valve spool in said bore having a first position directing substantially all flow to said primary outlet and a second position directing substantially all flow through said secondary outlet and variably positionable therebetween to proportion flow between said primary and secondary outlets, an orifice arranged to receive flow from said primary outlet passage, means associated with said orifice for varying the size thereof, means for transmitting fluid pressure existing upstream of said orifice to one end of said valve spool, passage means downstream of said orifice for transmitting fluid pressure downstream of said orifice to the opposite end of said spool whereby said spool assumes a position in said bore responsive to the pressure drop across said orifice, means for selectively overriding the position of said valve spool to reposition said spool in said second position whereby substantially all inlet flow will be diverted to said secondary outlet, said orifice-varying means operatively engageable with said override means so as to selectively actuate the latter mentioned means.

4. A control valve comprising a body having a bore therein with an inlet passage intersecting said bore at a first location for delivery of fluid to said valve, secondary and primary outlet passages intersecting said bore at second and third locations respectively adjacent either side of said inlet passage, a movable cannelured valve spool in said bore having a first position directing substantially all inlet flow to said primary outlet and a second position directing substantially all inlet flow through said secondary outlet and positionable therebetween to proportion flow between said primary and secondary outlets, a control orifice arranged to receive flow from said primary outlet passage, piston means having a portion cooperating with said control orifice and movable to vary the size of said control orifice, means for transmitting fluid pressure existing upstream of said orifice to one end of said spool, passage means downstream of said control orifice for transmitting fluid pressure downstream of said orifice to the opposite end of said spool whereby said spool assumes a pressure-balanced position in said bore responsive to the pressure drop across said orifice, a reciprocable plunger adjacent one end of said spool and having a stem extending from said body, said plunger when depressed adapted to override pressure actuation and place said spool in said second position, a control handle for said piston for moving said piston, a cam surface on said handle adapted to engage and depress said plunger when said piston is moved to a predetermined position whereby said inlet and secondary outlet are placed in selective hydraulic communication to divert substantially all inlet flow to said secondary outlet.

5. The valve of claim 4 further provided with a second fixed size orifice in said passage means downstream of said first orifice for controlling a pilot flow through said passage, relief valve means in hydraulic communication with said passage means and adapted to be actuated by said pilot flow and operative to relieve fluid from said passage means at a predetermined pressure thereby impressing a pressure differential across said spool to move said spool to said second position.

6. The valve of claim 5 wherein said pilot relief valve is connected to said secondary outlet passage whereby relieved pressure fluid is delivered to said secondary outlet passage.

* * * * *